July 21, 1931.  J. T. HUNTINGTON  1,815,356
THERMOSTATIC VALVE
Filed May 14, 1930
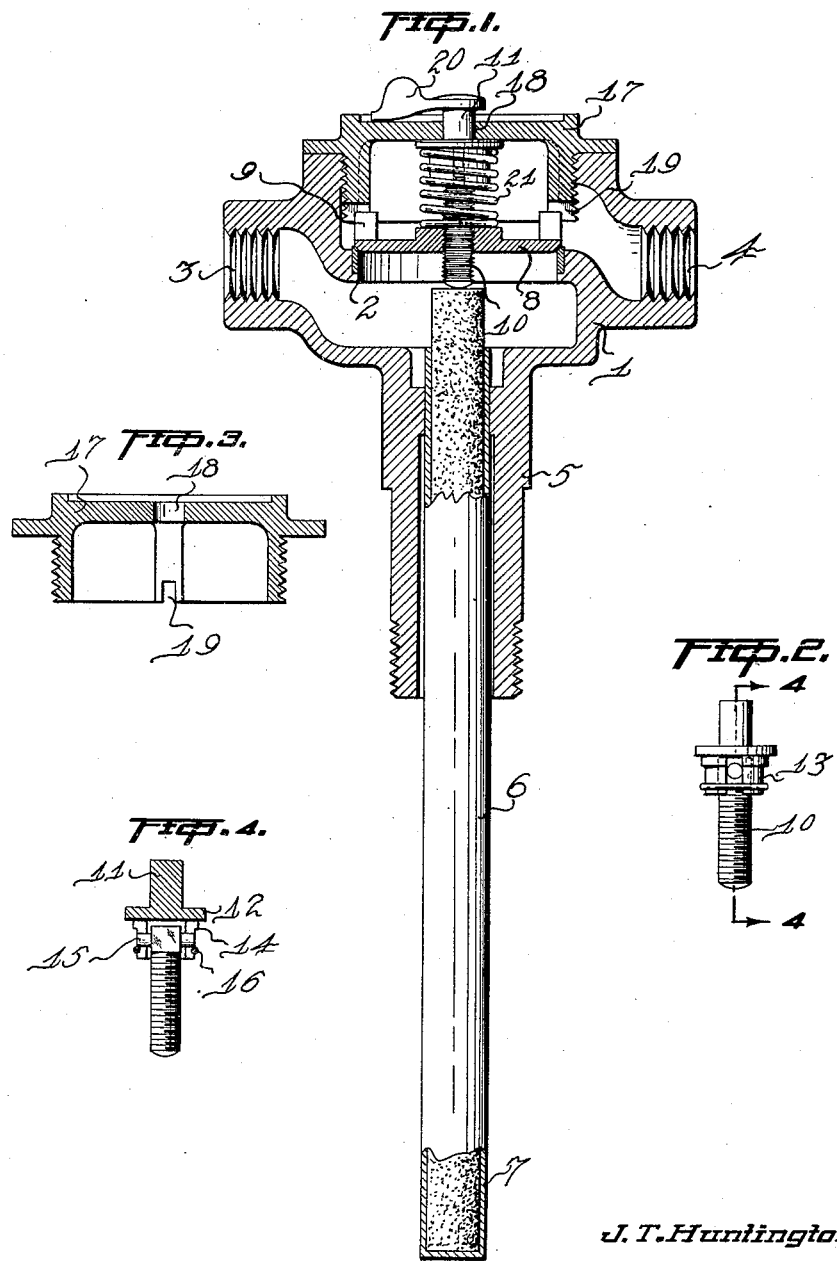
INVENTOR
J. T. Huntington
BY
ATTORNEYS Patented July 21, 1931

1,815,356

UNITED STATES PATENT OFFICE

J. T. HUNTINGTON, OF LANSING, MICHIGAN

THERMOSTATIC VALVE

Application filed May 14, 1930. Serial No. 452,453.

The present invention pertains to a novel thermostatic valve designed particularly to control the heating of a body of water by a gas burner therebeneath. Devices of this character are well known in the art and consist generally of a valve controlled by a thermostatic element in the body of water and in turn controlling the flow of gas to the burner in inverse ratio to the temperature of the water.

It is common for householders to dismantle these valves in order to clean the same, and in so doing, they destroy certain relations among the valve parts, as a result of which the limits of the valve opening and closing with relation to temperature cannot be accurately predetermined.

The object of the present invention is to overcome this difficulty and is accomplished by means of a structure permitting opening of the valve for cleaning purposes and at the same time preventing dismantling or relative rearrangement of the movable valve parts. The valve is usually opened by removal of a cap which carries the valve head and supporting pieces therefor, and it is these parts that are subject to the improper reassembling previously mentioned. In the present invention these parts are so assembled that they cannot be mutually separated or relatively displaced on removal of the cap, although relative movement in response to the thermostatic element is fully permitted.

The invention is fully disclosed by way of example in the following description and in the accompanying drawings, in which Figure 1 is a longitudinal section of the device;

Fig. 2 is a detail elevation of the adjusting screw assembly;

Fig. 3 is a detail section of the cap, and

Fig. 4 is a section of the line 4—4 of Fig. 2.

Reference to these views will now be made by use of like characters which are employed to designate corresponding parts throughout.

The valve comprises a valve body 1 formed with a valve seat 2 and inlet and outlet connections 3 and 4 at opposite sides thereof in the usual manner. Below the valve seat, the body is formed with a boss 5 in which is held a thermostatic element consisting of a copper or other metallic tube 6 containing a carbon rod 7. The operation of this element is well known. The copper tube expands when heated, causing the carbon rod to retract from the valve seat.

Upon the seat is mounted a valve disk 8 having guide lugs 9 projecting upwardly therefrom. An adjusting screw 10 is threaded through the valve disk for the purpose which will presently appear. To the upper end of the screw is connected a pin 11 having a base flange 12 with a skirt or tube 13 depending therefrom. The member 13 is formed with a pair of slots 14 which slidably receive a pin 15 passed through the head or upper end of the screw. A ring 16 is fitted on the tube 13 near the lower end thereof to prevent withdrawal of the pin 15 from the slots 14, and a permanent sliding connection between the screw and pin 11 is thus established.

A cap 17 is threaded into the top of the body 1 over the valve seat and has an aperture 18 which rotatably receives the pin 14 as clearly shown in Fig. 1. The lower edge of the cap has a pair of slots 19 which receive the lugs 9 for a purpose which will presently appear. To the upper or outer end of the pin 14 is secured a pointer 20, preferably in a permanent manner, adapted to cooperate with indicating means (not shown) provided on the top of the cap. A spring 21 surrounds a portion of the screw 10 and tube 13, bearing against the base flange 12 and the top of the valve disk 8 and thus tending to move the latter to its seat.

The thermostatic valve is mounted in the usual manner with the elements 6, 7 received in the zone to be heated, such as a body of water, and the connections 3 and 4 connected into the gas line leading to the burner. The valve disk is initially adjusted on the screw 10 in such a manner as to be lifted from its seat by contraction of the copper tube or cooling of the water whereupon more gas is supplied to the burner and a greater flame produced. The thermostatic element holds the valve open to an extent inversely proportional to the temperature of the water, in a manner already known to the art. The position of the valve on the screw may be altered for different maximum temperatures as desired, by manually turning the pointer 20. During such adjustment, the valve disk 8 is held against turning by the reception of the lugs 9 in the notches 19.

In cleaning the body of the valve, the cap 17 is naturally unscrewed and this operation may be performed without difficulty. However, trouble often arises as a result of separation of parts of the valve assembly, so that the necessary relation between the screw, the valve disk, pointer and indications on the cap is destroyed. This relation usually cannot be restored by an unskilled person and the utility of the device for an accurate control of temperature is therefore seriously impaired.

In the present instance, however, the valve parts are removed bodily with the cap because of the permanent connection between the screw 10 and the pin 14. This connection although permanent, permits ample play of the valve 8 under the action of the rod 7, due to the sliding connection between the screw and the pin. After removal of the cap from the valve body, as well as before, the position of the disk on the screw cannot be altered without a corresponding alteration of the relation between the pointer 20 and the indications on the cap. This property results from the fact that the valve disk is held in its turning by the reception of the lugs 9 in the slots 19 after the pin 11 has been mounted in the cap 17.

Although a specific embodiment of the invention has been illustrated and described, it will be understood that various alterations in the details of construction may be made without departing from the scope of the invention as indicated by the appended claims.

What I claim is:—

1. A thermostatic valve comprising a valve body having a valve seat, a cap detachably fitted to said body, a pin mounted in said cap, a screw having a sliding and permanent connection to said pin, a valve disk threaded on said screw and cooperating with said valve seat, means to prevent turning of said disk relatively to said cap, and an expansible thermostatic element mounted in said valve body and operative on said screw.

2. A thermostatic valve comprising a valve body having a valve seat, a cap detachably fitted to said body, a pin mounted in said cap, a screw having a sliding and permanent connection to said pin, a valve disk threaded on said screw and cooperating with said valve seat, a sliding connection between said disk and cap adapted to prevent turning of said disk relatively to said cap, and an expansible thermostatic element in said valve body and operative on said screw.

3. A thermostatic valve comprising a valve body having a valve seat, a cap detachably fitted to said body, a pin mounted in said cap, a screw having a sliding connection with said pin, means preventing separation of said screw from said pin, a valve disk threaded on said screw and cooperating with said valve seat, a sliding connection between said disk and cap adapted to prevent turning of said disk relatively to said cap, and an expansible thermostatic element mounted in said valve body and operative on said screw.

4. A thermostatic valve comprising a valve body having a valve seat, a cap detachably fitted to said body, a pin mounted in said cap, a screw having a sliding and permanent connection to said pin, a valve disk threaded on said screw and cooperating with said valve seat, a sliding connection between said disk and cap adapted to prevent turning of said disk relatively to said cap, an expansible thermostatic element in said valve body and operative on said screw, and an indicating device carried by said pin exteriorly of said cap.

In testimony whereof I affix my signature.

J. T. HUNTINGTON.